May 11, 1943.    L. B. HUTHSING    2,318,691
MICROMETER STOP
Filed March 2, 1942

LEO B. HUTHSING,
INVENTOR

BY Hazard and Miller

ATTORNEYS.

Patented May 11, 1943

2,318,691

UNITED STATES PATENT OFFICE 2,318,691

MICROMETER STOP

Leo Benjamin Huthsing, Los Angeles, Calif., assignor to Machinery Manufacturing Co., Los Angeles, Calif., a corporation of California Application March 2, 1942, Serial No. 433,015

10 Claims. (Cl. 77—33)

This invention relates to a micrometer stop for jig borers, drill presses, and similar tools.

An object of the invention is to provide a stop mechanism for limiting the downward movement of a boring tool on a jig borer, drill press, or similar machine tool which can be accurately adjusted so as to accurately limit the depth to which the boring tool is fed.

More specifically, an object of the invention is to provide a micrometer stop that may be used on jig borers, drill presses, and other machine tools wherein there is an indexed abutment which is held against rotation and which surrounds a screw and a nut threaded onto the screw carrying calibrations arranged adjacent the index and to provide a simple construction for holding the nut and abutment in firm contacting engagement longitudinally of the screw but at the same time permitting the nut to be freely rotated relatively to the abutment in effecting an adjustment.

With the foregoing and other objects in view, which will be made manifest in the following detailed description and specifically pointed out in the appended claims, reference is had to the accompanying drawing for an illustrative embodiment of the invention, wherein:

Figure 1:
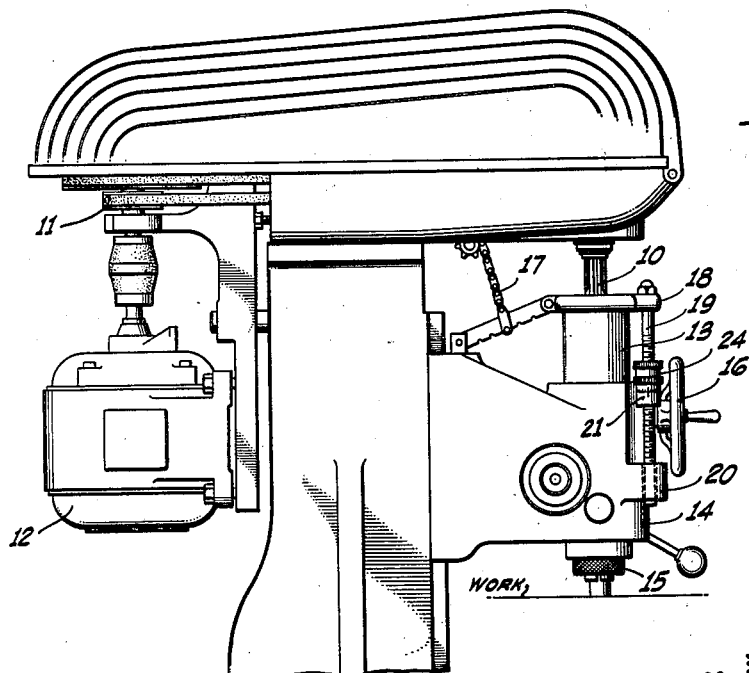
Figure 1 is a partial view in side elevation of a jig borer illustrating the micrometer stop embodying the present invention as having been applied thereto.
Figure 2:
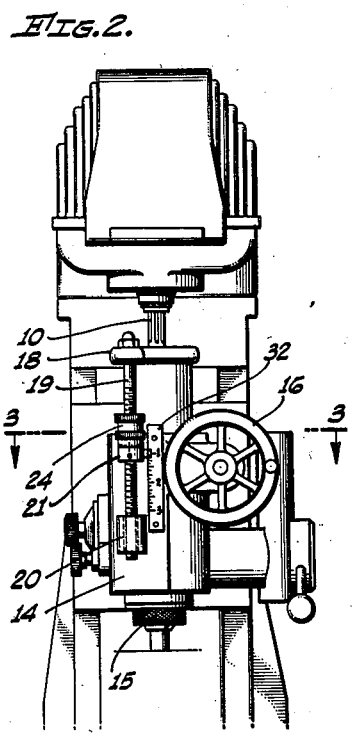
Fig. 2 is a front view in elevation of the jig borer illustrated in Fig. 1.

Referring to the accompanying drawing wherein similar reference characters designate similar parts throughout, 10 indicates a splined spindle or vertical shaft which is suitably driven through a belt drive 11 by an electric motor 12. The spindle 10 rotates through a vertically adjustable quill 13 which is slidable through a knee 14. This spindle drives a suitable chuck or tool holder 15 which is advanced toward the work or retracted therefrom on operation of the handwheel 16. The weight of the quill is counterbalanced by a suitable counterbalance which is connected thereto through a chain 17. On the top of the quill there is a suitable clamp 18 which provides an arm for a downwardly extending screw 19 that slidably extends through a boss 20 on the knee 14. The top surface of this boss provides a stationary abutment that when engaged by the bottom surface of an adjustable abutment 21 limits downward movement of the quill 13 and consequently downward movement of the boring tool. The adjustable abutment 21 is in the form of a ferrule or ring that telescopes over the screw 19. Its upper end is of reduced external diameter as indicated at 22, and this reduced upper end is externally grooved as at 23. A nut 24 is threaded onto the screw 19 and has a downwardly extending skirt 25 which extends over the reduced upper portion 22 of the abutment 21. An expansion spring or split ring 26, preferably tempered, fits freely, but without perceptible side play between the top and bottom of groove 23 and expands outwardly into firm frictional engagement with the cylindrical interior of the skirt 25. With this arrangement the nut 24 can be rotated to adjust its vertical position on the screw 19 and the spring 26 being in firm frictional engagement with the skirt will rotate or turn with the nut. The spring merely slides between the top and bottom walls of the groove 23 so that on rotation of the nut 24 the nut may turn relative to the adjustable abutment 21 but at the same time the frictional engagement between the spring 26 and the skirt will maintain the bottom of the skirt 25 and the shoulder 28 in firm engagement. Consequently, there will be no loose play at any time between the abutment 21 and the nut. Should any loose play develop this is easily and quickly taken up by forcing the abutment 21 upwardly against the nut as fas as it will go in which case the spring 26 obtains a new frictional purchase on the interior of the skirt 25 to hold the parts in contact. 29 indicates a jamb nut that is also threaded onto the screw 19 and which can be tightened or jammed against nut 24 to lock it in any adjusted position. The jamb nut 29 and nut 24 are preferably provided with knurled peripheral surfaces indicated at 30 and 31.

Figure 3:
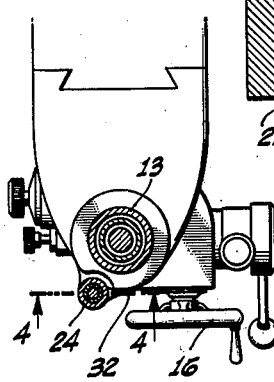
Fig. 3 is a horizontal section taken substantially upon the line 3—3 upon Fig. 2.
Figure 4:
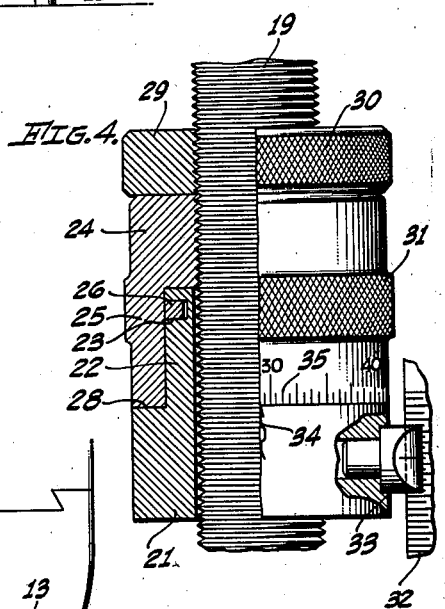
Fig. 4 is a view in side elevation of the micrometer stop, parts being broken away and shown in vertical section taken substantially upon the line 4—4 upon Fig. 3.

On the knee 14 adjacent the boss 20 there is secured a scale 32 and an index or pointer 33 is mounted on the abutment 21 and is vertically bifurcated so as to straddle an edge of the scale, see Fig. 3. Thus, the index 33 indicates the position of the bottom surface of the adjustable abutment 21 on the scale 32 and at the same time holds the abutment 21 against rotation sympathetically with the nut 24. A second index 34 is on the adjustable abutment 21 adjacent the shoulder 28 and the bottom of the skirt 25 is graduated as indicated at 35.

The threads on the screw 19 are preferably ten threads per inch and the scale 32 which may be in inches is preferably divided in tenths of an inch. The graduations at 35 preferably run from one to one hundred so that each graduation as it passes index 34 indicates a raising or lowering of the bottom surface of the abutment 21, $1/1000''$. If the boring tool that is in chuck 15 is at an initial point or point of departure and it is desired to have it bore or drill a certain depth, the adjustable abutment is lowered by nut 24 until it engages the top surface of the boss 20. Thus, the position of the initial point of the boring tool is ascertained on the scale 32 and on the graduations 35. If the depth of cut is to be a certain distance the nut 24 is rotated so as to elevate the adjustable abutment 21 that distance from the point of departure or starting point. When the abutment 21 has been elevated this distance representative of the depth of cut, the jamb nut 29 is tightened to lock the nut 24 in position and the boring tool is fed into the work by the handwheel 16 until the abutment 21 engages the top surface of boss 20. When such engagement takes place the cut has been completed.

It will of course be appreciated that although nut 24 must rotate relative to abutment 21 that there should be no loose play between the nut 24 and the abutment for if clearance were present dirt might work into the clearance and render the construction inaccurate. In constructing the abutment and nut it is relatively easy to accurately machine the groove 23 so that its walls will just clear the sides of the expansion ring 26. The expansion ring 26 is then placed in the groove and the reduced upper portion 22 telescoped into the skirt 25. The abutment and nut 24 are forced together as far as possible, leaving no clearance spaces between these parts. The expansion ring 26 frictionally seats itself with considerable force on the interior of the skirt to hold the parts in reasonably firm contact in a direction longitudinally of the screw 19. No loose play will develop ordinarily as the ring 26 accurately fits the groove 23. However, should loose play develop, this is very easily taken up by again forcing the abutment 21 toward nut 24 as far as possible. During rotation of the nut 24 the expansion ring 26 turns with the nut and relative to the abutment, and as the walls of groove 23 afford a relatively large area there is little opportunity for wear taking place that would allow loose play to develop.

While the invention has been primarily designed in connection with jig borers, drill presses, and the like, it will, of course, be appreciated that it is applicable wherever an adjustable stop or abutment is desired.

Various changes may be made in the details of construction without departing from the spirit or scope of the invention as defined by the appended claims.

I claim:

1. A micrometer stop for jig borers and the like comprising means providing two abutments arranged to be engaged to limit the feed of a tool, one of said abutments encircling a screw and being adjustable, means for holding said abutment against rotation, a nut threaded onto the screw for adjusting the adjustable abutment, and an expansion spring housed within a groove on the adjustable abutment frictionally engaging the interior of the nut to hold the abutment and nut in contacting engagement while permitting the nut to be rotated relative to the abutment.

2. A micrometer stop for jig borers and the like comprising means providing two abutments arranged to be engaged to limit the feed of a tool, one of said abutments encircling a screw and being adjustable, a nut threaded onto the screw, an expansion spring housed within a groove within the abutment and expanding into frictional engagement with the interior of the nut, a scale adjacent the adjustable abutment and an index on the abutment engaging the scale so as to traverse the scale and hold the abutment against rotation upon rotation of the nut.

3. A micrometer stop for jig borers and the like comprising means providing two abutments arranged to be engaged to limit the feed of a tool, one of said abutments encircling a screw and being adjustable, a nut threaded onto the screw, an expansion spring housed within a groove within the abutment and expanding into frictional engagement with the interior of the nut, a scale adjacent the adjustable abutment and an index on the abutment engaging the scale so as to traverse the scale and hold the abutment against rotation upon rotation of the nut, there being a second index on the abutment and a graduated scale on the periphery of the nut adjacent said second index.

4. A micrometer stop for jig borers and the like comprising means providing two abutments arranged to be engaged to limit the feed of a tool, one of said abutments encircling a screw and being adjustable, a nut threaded onto the screw, an expansion spring housed within a groove within the abutment and expanding into frictional engagement with the interior of the nut, a scale adjacent the adjustable abutment and an index on the abutment engaging the scale so as to traverse the scale and hold the abutment against rotation upon rotation of the nut, and a jamb nut on the screw adapted to be tightened against said nut to hold it in adjusted position.

5. In a micrometer stop, a screw, a nut on the screw, an externally grooved abutment fitting within a portion of the nut, and an expansion spring fitting within the groove frictionally engaging the interior of the nut enabling the nut and spring to turn relative to the abutment while retaining the abutment and nut in firm engagement longitudinally of the screw.

6. In a micrometer stop, a screw, a nut on the screw, an externally grooved abutment fitting within a portion of the nut, and an expansion spring fitting within the groove frictionally engaging the interior of the nut enabling the nut and spring to turn relative to the abutment while retaining the abutment and nut in firm engagement longitudinally of the screw, an index on the abutment and a scale arranged adjacent the abutment adapted to be traversed by the index, said index engaging the scale to hold the abutment against rotation.

7. In a micrometer stop, a screw, a nut on the screw, an externally grooved abutment fitting within a portion of the nut, and an expansion spring fitting within the groove frictionally engaging the interior of the nut enabling the nut and spring to turn relative to the abutment while retaining the abutment and nut in firm engagement longitudinally of the screw, an index on the abutment, said nut being peripherally graduated adjacent said index.

8. In a micrometer stop, a screw, a nut on the screw, an abutment on the screw adjacent the nut, a spring housed within a groove on one of the above-mentioned parts and frictionally engaging the other of said parts so as to be held thereby against rotation relatively thereto when the parts are rotated relatively to each other, one of said parts bearing an index and the other of said parts being graduated adjacent the index.

9. In a micrometer stop, a screw, a nut on the screw having a skirt, an abutment on the screw having a portion fitting within the skirt, said portion being externally grooved, an expansion spring fitting within the groove and frictionally engaging the interior of the skirt serving to hold the parts in assembled relationship while permitting the nut to be rotated relatively to the abutment.

10. In a micrometer stop, a screw, a nut on the screw having a skirt, an abutment on the screw having a portion fitting within the skirt, said portion being externally grooved, an expansion spring fitting within the groove and frictionally engaging the interior of the skirt serving to hold the parts in assembled relationship while permitting the nut to be rotated relatively to the abutment, and means for holding the abutment against rotation sympathetically with the nut.

LEO B. HUTHSING.